United States Patent [19]

Cielo et al.

[11] 4,166,277
[45] Aug. 28, 1979

[54] ELECTROSTATIC INK EJECTION PRINTING HEAD

[75] Inventors: Paolo Cielo; William D. Westwood, both of Ottawa, Canada

[73] Assignee: Northern Telecom Limited, Montreal, Canada

[21] Appl. No.: 845,068

[22] Filed: Oct. 25, 1977

[51] Int. Cl.² ............................................. G01D 15/16
[52] U.S. Cl. .................................... 346/140 R; 101/1; 101/DIG. 13
[58] Field of Search ................ 346/140 R, 75; 101/1, 101/DIG. 13

[56] References Cited

U.S. PATENT DOCUMENTS

| 2,143,376 | 1/1939 | Hansell | 346/140 R X |
| 3,177,800 | 4/1965 | Welsh | 101/1 |
| 3,452,360 | 6/1969 | Williamson | 346/140 R |
| 3,553,719 | 1/1971 | Miyazaki | 346/140 R |
| 3,666,966 | 5/1972 | Buss | 346/140 R X |
| 3,834,301 | 9/1974 | Croquelois | 101/1 |
| 3,887,928 | 6/1975 | Ohno | 346/140 |

Primary Examiner—Joseph W. Hartary
Attorney, Agent, or Firm—Sidney T. Jelly

[57] ABSTRACT

An electrostatic ink ejection printing head uses an ink reservoir having small holes in its wall, the ink retained within the holes by surface tension. An electrostatic field is produced at each hole, as required, to overcome the surface tension and cause the ink to move into contact with a paper sheet to produce a dot. The holes can be in any desired predetermined formation. An electrode can be positioned opposite each hole, the paper between electrode and hole, or an electrode can be formed around or on either side of each hole. The electrodes are pulsed as necessary.

5 Claims, 10 Drawing Figures

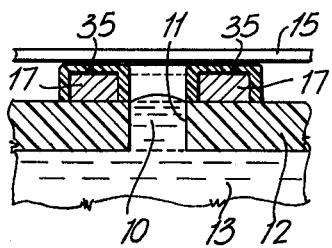
Fig-6-
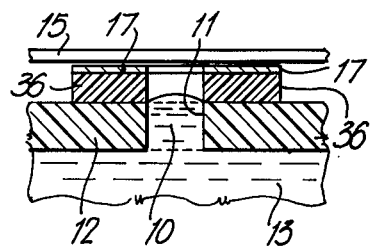
Fig-7-
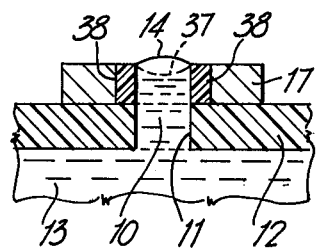
Fig-8-
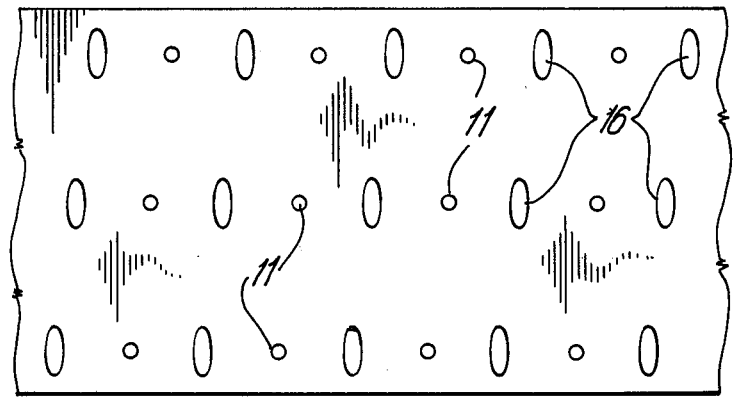
Fig-5-
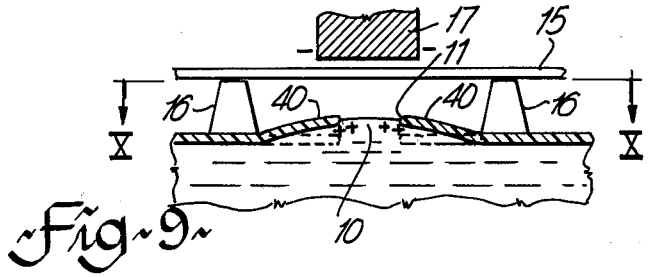
Fig-9-
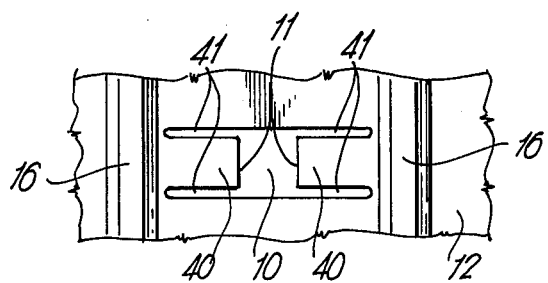
Fig-10-

ELECTROSTATIC INK EJECTION PRINTING HEAD

This invention relates to an electrostatic ink ejection printing head, particularly for a facsimile printer, for printing alphanumerics or other graphics, using dot patterns.

Various methods of printing exist, such as by impacting on paper with a stylus or other device, which may or may not produce an entire character at one time. However the desire for high speed printing, such as with computer "printouts", and for transmission of documents by telephone—facsimile printing—is spurring the development of non-impact printing devices.

Ink jet printing is in use, forming characters from small ink dots, produced by the ejection of ink. Ink is ejected under pressure through a small nozzle. Vibration of the ink within the nozzle ensures controlled drop formation. The drops are electrostatically deflected by voltages applied to deflection plates. If undeflected the drops are collected and the ink returned. If a drop is deflected it impinges on a sheet of paper. The paper is moved and by particular control of the voltages applied to the deflector plates, an appropriate pattern can be produced on the paper. A typical arrangement for ink jet printing is described in the IBM Journal of Research And Development, Vol. 21 No. 1, January 1977, pp. 2 to 9.

Ink jet printers suffer from certain disadvantages. Thus the apparatus is bulky and complex owing to the necessity of an ink recovery, recirculating and filtering system. High pressure ink containers are necessary, with some unreliability, and an ink fog is generated at the impact of ink with the paper. Depending upon the form of solution of the ink, greater or lesser evaporation of solvent can occur causing thickening of the ink as it is recirculated.

With the present invention, there is no ink jet as such, and thus no ink collection, filtering and recirculation. High pressure impact with the paper does not occur and therefore the production of ink fog avoided.

The invention comprises an ink printing head system in which ink in a reservoir extends into a plurality of narrow holes or slots in the wall of the reservoir, being retained within the holes or slots by surface tension. The ink is attracted out of the hole or slot onto a paper sheet adjacent the printing head by applying a voltage between the ink and selective annular electrodes mounted on the reservoir adjacent respective ones of the holes or slots. The paper is spaced from the reservoir by the electrodes which are internally lined with an ink-repelling or hydrophobic material. By relative movement between paper and printing head any pattern can be printed spot-by-spot. Generally a linear array of holes or slots is provided, with associated electrodes, to print a predetermined pattern line-by-line by moving the paper relative to the printing head, in a direction normal to the longitudinal axis of the array. The holes or slots can be arranged in various ways, including a character array i.e., a 5×7 matrix as used in many computer terminals. Effectively, the surface tension of the ink in the hole or slot is momentarily overcome by an electrostatic field developed by the voltage across the ink and electrode. Considerable advantages and variations arise from the invention as will be readily understood by the following description of various embodiments, by way of example, in conjunction with the accompanying diagrammatic drawings, in which:

FIG. 5 is a plan view of a printing head illustrating an alternative pattern of holes;

FIGS. 6 and 7 are cross-sections, similar to that of FIG. 1, illustrating modifications thereof;

FIG. 8 is a cross-section similar to those of FIGS. 6 and 7, illustrating the effect of correct material selection;

FIG. 9 is a further cross-section similar to that of FIG. 1, illustrating a further modification thereof;

FIG. 10 is a cross-section on the line X—X of FIG. 9.

Figure 1:
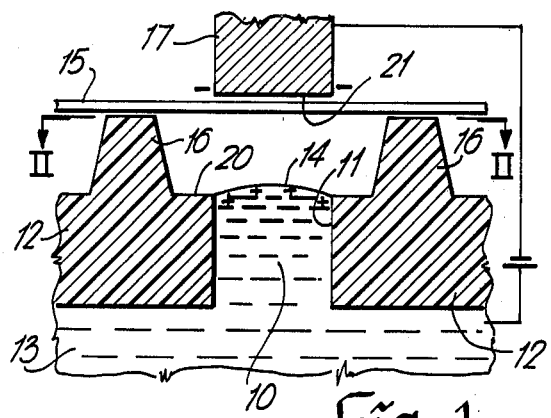
FIG. 1 is a cross-section through a hole and associated electrode of a printing head, illustrating the basic feature of the invention.

As illustrated in FIG. 1, ink 10 extends up into a small hole 11 in the wall 12 of the printing head reservoir, indicated generally at 13. The ink is held in the hole by surface tension, assuming an arcuate surface 14. Surface 14 may be convex or concave depending upon the material of the wall 12. A sheet of paper 15 is held spaced from the ink surface 14 by spacers 16. The wall 12 and spacers 16, which may be integral, are of electrically insulating material. On the opposite side of the paper 15 is positioned an electrode 17, aligned with the hole 11. The surface tension pressure is inversely proportional to the diameter of the hole.

When a potential difference is applied between electrode 17 and ink 10, the charge induced on the ink surface, indicated at 18, exerts an electrostatic pressure which opposes the surface tension and causes ejection of a drop of ink from the hole 11 when the voltage is higher than a threshold value, $V_{th}$. In FIG. 1, a particular voltage difference is indicated, ie, the ink positive and electrode negative. However this can be reversed.

The value of $V_{th}$ decreases with increasing hole diameter and with decreasing distance between the electrode and ink surface. Also, the thickness, and polarization characteristics, of the paper will affect $V_{th}$. Typical values of $V_{th}$ are in the range of 500–1500 volts with a hole diameter of about 200 μm and electrode—ink distance of about 200 μm. Electrode-ink distance is substantially the distance between the surface 20 of the printing head and surface 21 of the electrode 17.

Figure 2:
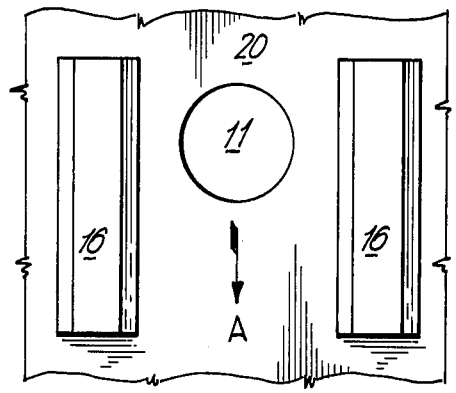
FIG. 2 is a plan view of the printing head of FIG. 1, on the line II—II of FIG. 1.

To reduce ink adhesion on the surface 20 it can be coated with a hydrophobic material, if a water-based ink is used. Also the spacers can be shaped to prevent the paper closing down nearer to the surface 20 after passing over the hole 11 and thus also reducing possibility of ink adhesion to this surface. This is illustrated in FIG. 2, where the relative movement of the paper would be in the direction of the arrow A.

Figure 3:
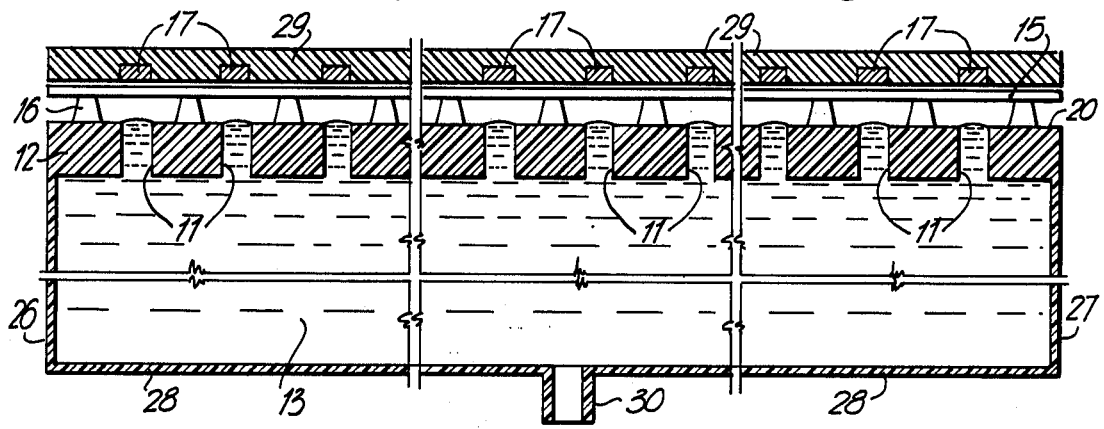
FIG. 3 is a longitudinal cross-section through a form of printing head.

FIG. 3 illustrates one form of printing head having a linear array of holes 11. The printing head is shown to a considerably enlarged scale, for clarity, and in sections for convenience. A row of holes 11 extends across the printing head in the wall 12. Wall 12, ends 26 and 27 and rear wall 28 form the reservoir 13. The wall 12 is of electrically insulating material, as in FIG. 1, and ends 26 and 27 and rear wall 28 are also of insulating material or can be of electrically conducting material and provide electrical contact means to the ink 10 in the reservoir 25 and the holes 11. The electrodes 17 are shown formed in an electrically insulating substrate 29. The printing head extends for the width of the paper 15. A conduit 30 is provided for supplying ink to the reservoir 13.

Figure 4:
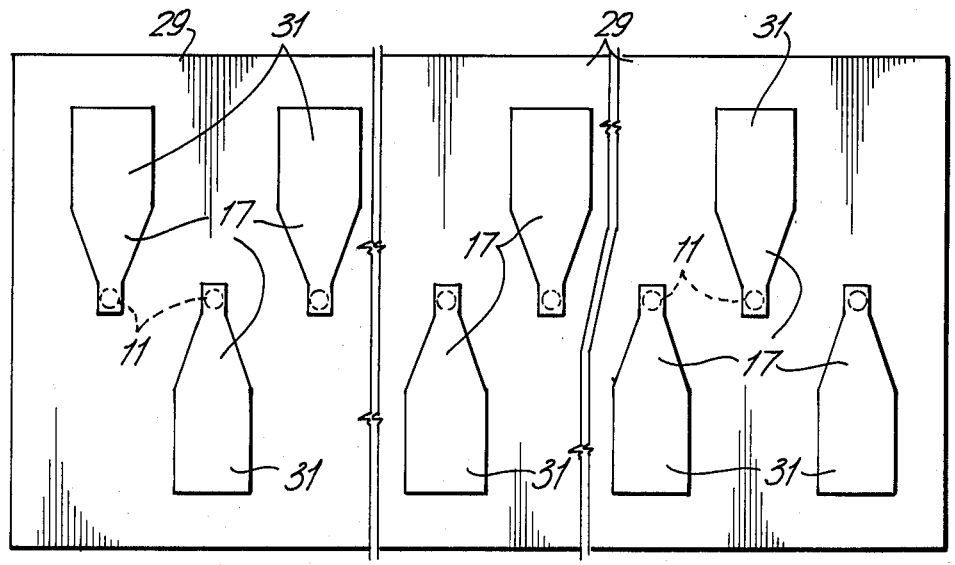
FIG. 4 is a plan view of a typical electrode pattern for a printing head as in FIG. 3.

FIG. 4 illustrates one pattern of electrodes 17 for a printing head as in FIG. 3. In the particular example, by alternating the electrodes to extend on either side of the holes—the position of which are indicated by dotted outline at 11—they can be tapered to provide wider contact areas at 31 without being closely spaced to an extent which makes fabrication difficult. A minimum distance between electrodes of the order of 250 μm is desirable to avoid air break-down at 2000 volts, but this distance can be reduced by surrounding the electrodes with a stronger dielectric, as in FIG. 3.

It is possible to increase the distance between electrodes by providing a multiplicity of rows of holes, the holes in even rows staggered in relation to the other rows, to form inclined columns. FIG. 5 illustrates an arrangement having three rows of holes 11, with associated spacers 16. The distance between centres of adjacent holes is larger by a factor of three in FIG. 5, as compared with the arrangement of FIG. 2. Different columns of a line are printed sequentially, after stepping of the paper. If $\mu$ rows are employed ($\mu=3$ in FIG. 5) the minimum distance between holes can be increased by a factor of $\mu$.

An alternative arrangement, not illustrated, is to have a single row of holes, with sufficient space between each hole for access and insulation, and to move the paper sideways in small increments before stepping paper for printing the next row.

Other arrangements of holes can give other desirable geometries, such as 5×7 matrix arrays to print one character in parallel, or vertical arrays for example seven holes, scanned along the paper to print one character line per scan.

Hydrophobic coating of the surface 20, together with the movement of the paper assists in preventing ink overflow into the paper after the voltage has been dropped. The dimensions of the holes 11 determines the typical spot diameter of the paper and thus the possible resolution of the printed pattern. Hole diameters in the range from about 100 μm are suitable for printing alphanumerics or graphics.

Any kind of paper or other material which can retain the ink drops can be used but good absorption is preferable for fast ink drying. The electrical polarizability and conductivity of the paper, or other material, affect the threshold voltage. Any kind of ink can be used, but some electrical conductivity and low viscosity produce a fast building up of the surface charge and rapid ink flow. A resistivity in the range of $10^6$–$10^7 \Omega$ cm is sufficiently low, and a viscosity, for example, lower than 1 poise is quite acceptable. The particles diluted, or in suspension, in the ink should have a maximum diameter smaller than the hole diameter, and preferably considerably smaller. The ink should not contain volatile substances of unpleasant or dangerous odor. A water-based dye is one example of a useful ink.

A constant hydrostatic pressure, lower than the surface tension pressure, could be applied to the ink in order to reduce the value of $V_{th}$ (threshold voltage). However, this could increase the possibility of a spontaneous overflow of the ink. An alternative, and more effective method, is to apply an acoustic wave by a transducer on or in the ink reservoir for example, so that drop ejection would require a lower voltage if the voltage pulse is applied when the pressure wave is at a maximum. The subsequent pressure minimum would assist in stopping ink overflow when the voltage is dropped.

The electrodes 17 are independently addressed by a driving circuit of conventional form. While independently addressed, several electrodes along a row, in an arrangement as in FIG. 3 for example, could be activated at the same time, depending upon the signals received from the originating scanner, or other source. Where the information received arrives character by character some form of buffer memory will be necessary, plus means for translating the received information into corresponding dot patterns. The paper, or other material, sheet can be moved continuously or step-by-step.

Typically, a voltage pulse is of the order of 10 milliseconds. It is possible to print 4000 spots per second, approximately 200 characters per second. There is a very low energy requirement to charge the condenser formed between electrode and ink, considerably lower than in other impact or non-impact techniques.

As so far described, the electrode has been considered as being on the opposite side of the paper sheet to the holes 11. It is also possible to position the electrodes nearer the holes between the paper and the reservoir surface.

FIGS. 6 and 7 illustrate two alternative electrode arrangements. In FIG. 6, the electrodes 17 replace the spacers 16 of FIG. 1. The electrode is covered with a layer of hydrophobic material 35 and the paper sheet 15 rests directly on the coated electrode. The function of the electrode is effectively to create an electrostatic field the related component of which causes the ink 10 to move up into contact with the paper. This arrangement requires a lower voltage for building up an electric field above threshold, as the electrode-to-ink distance is less, and the paper thickness does not affect the voltage requirements. In the arrangement in FIG. 7, the electrode 17 is formed on top of a hydrophobic spacer 36. The paper sheet 15 can rest on the electrode 17, although in FIGS. 6 and 7 the paper is shown spaced slightly for clarity.

As the ink does not adhere to the surfaces of the spacers, or electrodes, if these surfaces are hydropholine, the ink remains at the level of the top surface of the wall 12 when no voltage is applied. This is more particularly so if the electrodes 17 (FIG. 6) or spacers 36 (FIG. 7) are elongate, as the spacer shape in FIG. 2.

The need to line the hole of the electrode 17, for example in the arrangement of FIG. 6, with a hydrophobic material is explained with FIG. 8. If a non hydrophobic material forms the inner surface of the electrode hole, then the ink will adhere to this surface with a contact angle less than 90°, that is the ink surface will be concave, as indicated by the dotted line 37. Thus there will be no vertical force moving the ink surface toward the paper. However, with a hydrophobic lining 38, the ink remains, with a convex surface 14, at the interface between wall 12 and electrode 17, i.e., as in FIG. 6, until a voltage is applied, when the ink moves up, still with a convex surface, to the top surface, as in FIG. 8, to contact the paper. Various methods can be used to form the electrodes and hydrophobic layers or coatings, for example evaporation techniques.

A further modification is to form the holes with deformable sides. Thus, as illustrated in FIGS. 9 and 10, a modification of the arrangement of FIG. 1, the wall 12 is formed with portions 40 of an elastomeric material which are deflected towards the paper 15 when the voltage pulse is applied. This both increases hole size, which reduces the surface tension pressure, and also decreases the ink to paper distance, reducing the $V_{th}$. On dropping of the voltage, the return of the wall assists in closing off ink supply and preventing ink overflow. It is also possible to provide an electrode inside the reservoir to "push" the flexible wall around the hole. The very small gaps 41 along each side of the portions 40 are small enough to prevent ink emitting, even when a voltage is applied.

While the holes 11 have been generally considered as round, they can be of other shapes, such as square or elongate, depending upon fabrication requirements and print quality required.

While ejection, or projection, of the ink has been referred to in the above description, it will be appreciated that the degree of such "ejection" is very small, being only that necessary to cross the distance between the surface 20 and the lower surface of the paper 15 in FIGS. 1 and 3. This is quite different to the ink-jet system. No effectual "ejection" or "projection" occurs in the arrangements of FIGS. 6 and 7, and very little in FIG. 9.

What is claimed is:

1. An electrostatic ink ejection printing head, for printing on a sheet of material, comprising:

an ink reservoir;

a plurality of holes in a wall of said reservoir, said holes spaced at predetermined distances in a predetermined pattern, and of a size whereby said ink is retained from emission from the holes by surface tension;

a plurality of annular spacers supported by the reservoir wall, for maintaining the material at least a predetermined distance from the wall, the spacers surrounding and defining outer extensions of respective ones of said plurality of holes, each of the spacers combining an electrode and a hydrophobic portion a major part at least of the spacer surface defining said hole extension being hydrophobic; and means for applying a voltage between ink in the reservoir and any preselected electrode to overcome surface tension whereby ink will emit into contact with said material.

2. An electrostatic printing head as claimed in claim 1, in which each electrode is of annular form having a pair of flat surfaces and inner and outer curved surfaces.

3. An electrostatic printing head as claimed in claim 2, in which the electrode is sealed against the wall at a flat surface, the other surfaces being coated in hydrophobic material.

4. An electrostatic printing head as claimed in claim 2, in which the hydrophobic portion is annular in shape and is sandwiched between the electrode and the wall.

5. An electrostatic printing head as claimed in claim 2, in which the hydrophobic portion is annular and is located adjacent said electrode inner curved surface.

* * * * *